US012061606B1

(12) United States Patent
Kadado et al.

(10) Patent No.: US 12,061,606 B1
(45) Date of Patent: Aug. 13, 2024

(54) TRACKING AND REPORTING CHANGES IN DATA RECORDS

(71) Applicant: State Farm Mutual Automobile Insurance Company, Bloomington, IL (US)

(72) Inventors: Taha Kadado, Sachse, TX (US); Dhivya Kannan, Frisco, TX (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 360 days.

(21) Appl. No.: 17/229,123

(22) Filed: Apr. 13, 2021

Related U.S. Application Data

(60) Provisional application No. 63/009,375, filed on Apr. 13, 2020.

(51) Int. Cl.
*G06F 16/23* (2019.01)
*G06F 16/2455* (2019.01)

(52) U.S. Cl.
CPC ...... *G06F 16/2455* (2019.01); *G06F 16/2358* (2019.01); *G06F 16/2365* (2019.01)

(58) Field of Classification Search
CPC ............. G06F 16/2358; G06F 16/2365; G06F 16/2455
USPC ........................................................ 707/769
See application file for complete search history.

(56) References Cited

U.S. PATENT DOCUMENTS

| | | | |
|---|---|---|---|
| 6,832,229 B2 | 12/2004 | Reed | |
| 6,976,038 B2 | 12/2005 | Acree et al. | |
| 6,999,977 B1* | 2/2006 | Norcott | G06F 16/254 |
| | | | 707/999.203 |
| 7,707,177 B2 | 4/2010 | Bank et al. | |
| 7,822,717 B2 | 10/2010 | Kapoor et al. | |
| 7,984,131 B1* | 7/2011 | Gandhi | H04L 41/0856 |
| | | | 709/200 |
| 8,001,098 B2 | 8/2011 | Matsumoto et al. | |
| 8,027,955 B2 | 9/2011 | He et al. | |
| 8,135,633 B1* | 3/2012 | LeBaron | G06Q 40/12 |
| | | | 705/30 |
| 8,346,714 B1* | 1/2013 | Ramesh | G06F 16/28 |
| | | | 707/600 |
| 9,747,295 B1 | 8/2017 | Antao | |
| 9,754,001 B2 | 9/2017 | Banister et al. | |
| 10,454,963 B1* | 10/2019 | Smith | G06F 16/2477 |

(Continued)

*Primary Examiner* — Sherief Badawi
*Assistant Examiner* — Jessica N Le
(74) *Attorney, Agent, or Firm* — Lee & Hayes, P.C.

(57) ABSTRACT

This disclosure describes systems, devices, and techniques for tracking changes to a base record, such as a database. An example method includes identifying a change associated with a first entry in the base record and identifying a time of the change. A corresponding change entry, indicating the first entry and the time of the change in the base record, can be stored in a change record. The change record can be a database that can be queried by external systems to retrieve updated data about changes to the base record. One or more external systems can update derived records by retrieving, from the change record, the latest updated data associated with the source base record within a specified time frame or based on a last retrieved change entry ID. Likewise, one or more external auditing systems can retrieve, from the change record, all applied changes to the source base record.

20 Claims, 8 Drawing Sheets

(56) References Cited

U.S. PATENT DOCUMENTS

| | | | |
|---|---|---|---|
| 10,671,641 B1* | 6/2020 | Holenstein | G06F 16/284 |
| 10,769,114 B2 | 9/2020 | Fuller | |
| 11,055,276 B2* | 7/2021 | Caro | G06F 16/2365 |
| 11,263,193 B2* | 3/2022 | Leingang | G06F 16/219 |
| 2003/0233431 A1 | 12/2003 | Reddy et al. | |
| 2005/0097149 A1* | 5/2005 | Vaitzblit | G06F 16/2358 |
| 2011/0093279 A1* | 4/2011 | Levine | G06F 16/24 |
| | | | 235/375 |
| 2011/0191299 A1* | 8/2011 | Huynh Huu | G06F 16/2358 |
| | | | 707/648 |
| 2012/0078917 A1* | 3/2012 | Gradin | G06F 16/23 |
| | | | 707/E17.084 |
| 2013/0218879 A1* | 8/2013 | Park | G06F 16/29 |
| | | | 707/724 |
| 2015/0019480 A1* | 1/2015 | Maquaire | G06F 16/2365 |
| | | | 707/609 |
| 2015/0025960 A1* | 1/2015 | Gadamsetty | G06Q 30/0269 |
| | | | 707/610 |
| 2015/0052108 A1* | 2/2015 | Volk | G06F 11/1446 |
| | | | 707/649 |
| 2015/0379038 A1 | 12/2015 | Nikolov | |
| 2017/0293619 A1* | 10/2017 | Dubey | G06F 16/211 |
| 2018/0173772 A1* | 6/2018 | Anantha | G06F 16/248 |
| 2019/0102257 A1 | 4/2019 | Zhou et al. | |
| 2019/0347344 A1* | 11/2019 | Kessler | G06F 11/3055 |
| 2019/0377723 A1* | 12/2019 | Caro | G06F 16/219 |
| 2020/0125660 A1* | 4/2020 | Shuma | G06F 16/2358 |
| 2020/0159843 A1* | 5/2020 | Leingang | G06F 16/219 |
| 2020/0183909 A1* | 6/2020 | Muralidhar | G06F 16/2365 |

* cited by examiner

Base Record 200

| Identifier 202 | Content 204 |
|---|---|
| Identifier 1 | Content 1 |
| Identifier 2 | Content 2 |
| ... | ... |
| Identifier *n* | Content *n* |

FIG. 2A

Change Record 206

| Content 204 | Change Type 208 | Timestamp 210 | Entry 212 |
|---|---|---|---|
| Content *k* | Type *k* | Time *k* | Entry 1 |
| Content *k+1* | Type *k+1* | Time *k+1* | Entry 2 |
| ... | ... | ... | ... |
| Content *m* | Type *m* | Time *m* | Entry *p* |

Base Record 302

| Identifier 304 | Name 306 | Birthdate 308 | Occupation 310 |
|---|---|---|---|
| 1 | Augusta Lovelace | 10 December 1815 | Mathematician |
| 2 | Nikolai Tesla | 10 July 1856 | Engineer |
| 3 | Maude Menten | 20 March 1879 | Physician |
| 4 | George Edison | 11 February 1847 | Teacher |
| 5 | Marie Curie | 7 November 1867 | Physicist |
| 6 | Louis Pasteur | 27 December 1822 | Biologist |
| 7 | Ludwig van Beethoven | 1 December 1770 | Composer |

Change Record 312

| Identifier 304 | Name 306 | Birthdate 308 | Occupation 310 | Change Type 314 | Timestamp 316 | Entry 318 |
|---|---|---|---|---|---|---|
| 1 | Augusta Lovelace | 10 December 1815 | Mathematician | Addition | Jan 11 20 04:05:05 | 1 |
| 2 | Nikolai Tesla | 10 July 1856 | Engineer | Addition | Jan 11 20 04:05:06 | 2 |
| 3 | Maude Menten | 20 March 1879 | Physician | Addition | Jan 11 20 04:05:07 | 3 |
| 4 | George Edison | 11 February 1847 | Teacher | Addition | Jan 11 20 04:05:08 | 4 |
| 5 | Marie Curie | 7 November 1867 | Physicist | Addition | Jan 11 20 04:05:09 | 5 |
| 6 | Louis Pasteur | 27 December 1822 | Biologist | Addition | Jan 11 20 04:05:10 | 6 |
| 7 | Ludwig van Beethoven | 1 December 1770 | Composer | Addition | Jan 11 20 04:05:11 | 7 |

First Updated Data 320

| Identifier 304 | Name 306 | Birthdate 308 | Occupation 310 | Change Type 314 | Entry 318 |
|---|---|---|---|---|---|
| 1 | Augusta Lovelace | 10 December 1815 | Mathematician | Addition | 1 |
| 2 | Nikolai Tesla | 10 July 1856 | Engineer | Addition | 2 |
| 3 | Maude Menten | 20 March 1879 | Physician | Addition | 3 |
| 4 | George Edison | 11 February 1847 | Teacher | Addition | 4 |
| 5 | Marie Curie | 7 November 1867 | Physicist | Addition | 5 |
| 6 | Louis Pasteur | 27 December 1822 | Biologist | Addition | 6 |
| 7 | Ludwig van Beethoven | 1 December 1770 | Composer | Addition | 7 |

Base Record 302

| Identifier 304 | Name 306 | Birthdate 308 | Occupation 310 |
|---|---|---|---|
| 1 | Augusta Lovelace | 10 December 1815 | Mathematician |
| 2 | Nikolai Tesla | 10 July 1856 | Engineer |
| 3 | Maude Menten | 20 March 1879 | Physician |
| 4 | George Edison | 11 February 1847 | Teacher |
| 5 | Marie Curie | 7 November 1867 | Physicist |
| 6 | Louis Pasteur | 27 December 1822 | Biologist |
| 8 | Melitta Bentz | 31 January 1873 | Entrepreneur |

Change Record 312

| Identifier 304 | Name 306 | Birthdate 308 | Occupation 310 | Change Type 314 | Timestamp 316 | Entry 318 |
|---|---|---|---|---|---|---|
| 1 | Augusta Lovelace | 10 December 1815 | Mathematician | Addition | Jan 11 20 04:05:05 | 1 |
| 2 | Nikolai Tesla | 10 July 1856 | Engineer | Addition | Jan 11 20 04:05:06 | 2 |
| 3 | Maude Menten | 20 March 1879 | Physician | Addition | Jan 11 20 04:05:07 | 3 |
| 4 | George Edison | 11 February 1847 | Teacher | Addition | Jan 11 20 04:05:08 | 4 |
| 5 | Marie Curie | 7 November 1867 | Physicist | Addition | Jan 11 20 04:05:09 | 5 |
| 6 | Louis Pasteur | 27 December 1822 | Biologist | Addition | Jan 11 20 04:05:10 | 6 |
| 7 | Ludwig van Beethoven | 1 December 1770 | Composer | Addition | Jan 11 20 04:05:11 | 7 |
| 8 | Melitta Bentz | 31 January 1873 | Entrepreneur | Addition | Jan 12 20 03:05:07 | 8 |
| 7 | Ludwig van Beethoven | 1 December 1770 | Composer | Deletion | Jan 12 20 04:08:10 | 9 |

Second Updated Data 322

| Identifier 304 | Name 306 | Birthdate 308 | Occupation 310 | Change Type 314 | Entry 318 |
|---|---|---|---|---|---|
| 8 | Melitta Bentz | 31 January 1873 | Entrepreneur | Addition | 8 |
| 7 | Ludwig van Beethoven | 1 December 1770 | Composer | Deletion | 9 |

FIG. 3B

Base Record 302

| Identifier 304 | Name 306 | Birthdate 308 | Occupation 310 |
|---|---|---|---|
| 1 | Ada Lovelace | 10 December 1815 | Mathematician |
| 2 | Nikolai Tesla | 10 July 1856 | Engineer |
| 3 | Maude Menten | 20 March 1879 | Physician |
| 4 | Thomas Edison | 11 February 1847 | Entrepreneur |
| 5 | Marie Curie | 7 November 1867 | Physicist |
| 6 | Louis Pasteur | 27 December 1822 | Biologist |
| 8 | Melitta Bentz | 31 January 1873 | Entrepreneur |

Change Record 312

| Identifier 304 | Name 306 | Birthdate 308 | Occupation 310 | Change Type 314 | Timestamp 316 | Entry 318 |
|---|---|---|---|---|---|---|
| 1 | Augusta Lovelace | 10 December 1815 | Mathematician | Addition | Jan 11 20 04:05:05 | 1 |
| 2 | Nikolai Tesla | 10 July 1856 | Engineer | Addition | Jan 11 20 04:05:06 | 2 |
| 3 | Maude Menten | 20 March 1879 | Physician | Addition | Jan 11 20 04:05:07 | 3 |
| 4 | George Edison | 11 February 1847 | Teacher | Addition | Jan 11 20 04:05:08 | 4 |
| 5 | Marie Curie | 7 November 1867 | Physicist | Addition | Jan 11 20 04:05:09 | 5 |
| 6 | Louis Pasteur | 27 December 1822 | Biologist | Addition | Jan 11 20 04:05:10 | 6 |
| 7 | Ludwig van Beethoven | 1 December 1770 | Composer | Addition | Jan 11 20 04:05:11 | 7 |
| 8 | Melitta Bentz | 31 January 1873 | Entrepreneur | Addition | Jan 12 20 03:05:07 | 8 |
| 7 | Ludwig van Beethoven | 1 December 1770 | Composer | Deletion | Jan 12 20 04:08:10 | 9 |
| 1 | Ada Lovelace | 10 December 1815 | Mathematician | Update | Jan 13 20 01:03:05 | 10 |
| 4 | George Edison | 11 February 1847 | Entrepreneur | Update | Jan 13 20 04:04:06 | 11 |
| 4 | Thomas Edison | 11 February 1847 | Entrepreneur | Update | Jan 13 20 06:04:06 | 12 |

Third Updated Data 324

| Identifier 304 | Name 306 | Birthdate 308 | Occupation 310 | Change Type 314 | Entry 318 |
|---|---|---|---|---|---|
| 1 | Ada Lovelace | 10 December 1815 | Mathematician | Update | 10 |
| 4 | Thomas Edison | 11 February 1847 | Entrepreneur | Update | 12 |

FIG. 3C

Base Record 302

| Identifier 304 | Name 306 | Birthdate 308 | Occupation 310 |
|---|---|---|---|
| 1 | Ada Lovelace | 10 December 1815 | Mathematician |
| 2 | Nikolai Tesla | 10 July 1856 | Engineer |
| 3 | Maude Menten | 20 March 1879 | Physician |
| 4 | Thomas Edison | 11 February 1847 | Entrepreneur |
| 5 | Marie Curie | 7 November 1867 | Physicist |
| 6 | Louis Pasteur | 27 December 1822 | Biologist |
| 8 | Melitta Bentz | 31 January 1873 | Entrepreneur |

Change Record 312

| Identifier 304 | Name 306 | Birthdate 308 | Occupation 310 | Change Type 314 | Timestamp 316 | Entry 318 |
|---|---|---|---|---|---|---|
| 1 | Augusta Lovelace | 10 December 1815 | Mathematician | Addition | Jan 11 20 04:05:05 | 1 |
| 2 | Nikolai Tesla | 10 July 1856 | Engineer | Addition | Jan 11 20 04:05:06 | 2 |
| 3 | Maude Menten | 20 March 1879 | Physician | Addition | Jan 11 20 04:05:07 | 3 |
| 4 | George Edison | 11 February 1847 | Teacher | Addition | Jan 11 20 04:05:08 | 4 |
| 5 | Marie Curie | 7 November 1867 | Physicist | Addition | Jan 11 20 04:05:09 | 5 |
| 6 | Louis Pasteur | 27 December 1822 | Biologist | Addition | Jan 11 20 04:05:10 | 6 |
| 7 | Ludwig van Beethoven | 1 December 1770 | Composer | Addition | Jan 11 20 04:05:11 | 7 |
| 8 | Melitta Bentz | 31 January 1873 | Entrepreneur | Addition | Jan 12 20 03:05:07 | 8 |
| 7 | Ludwig van Beethoven | 1 December 1770 | Composer | Deletion | Jan 12 20 04:08:10 | 9 |
| 1 | Ada Lovelace | 10 December 1815 | Mathematician | Update | Jan 13 20 01:03:05 | 10 |
| 4 | George Edison | 11 February 1847 | Entrepreneur | Update | Jan 13 20 04:04:06 | 11 |
| 4 | Thomas Edison | 11 February 1847 | Entrepreneur | Update | Jan 13 20 06:04:06 | 12 |

Fourth Updated Data 326

| Identifier 304 | Name 306 | Birthdate 308 | Occupation 310 | Change Type 314 | Entry 318 |
|---|---|---|---|---|---|
| 8 | Melitta Bentz | 31 January 1873 | Entrepreneur | Addition | 8 |
| 7 | Ludwig van Beethoven | 1 December 1770 | Composer | Deletion | 9 |
| 1 | Ada Lovelace | 10 December 1815 | Mathematician | Update | 10 |
| 4 | Thomas Edison | 11 February 1847 | Entrepreneur | Update | 12 |

FIG. 3D

TRACKING AND REPORTING CHANGES IN DATA RECORDS

RELATED APPLICATIONS

This U.S. Patent Application claims priority to provisional U.S. Patent Application No. 63/009,375, entitled "Tracking and Reporting Changes in Data Records," filed on Apr. 13, 2020, the entirety of which is incorporated herein by reference.

TECHNICAL FIELD

The present disclosure relates to tracking changes to a base record, such as a database, and more particularly to maintaining a corresponding change record that can be queried by one or more external systems to update derived records stored by the external systems based on the change record.

BACKGROUND

Modern computing systems store data in various data records, such as databases. A database can include organized data that can be electronically accessed, managed, and/or modified by a computer system. In various cases, a database system can include the organized data, which may be stored in physical memory, as well as an accompanying software system, known as a Database Management System (DBMS) that executes operations on the stored data.

Database transactions can include one or more types of operations that can be executed by a DBMS against a database. In various examples, a database system can execute database transactions that have Atomicity, Consistency, Isolation, and Durability (ACID) transaction properties. A transaction has atomicity if either all or none of the operations within a transaction are performed, regardless of whether the transaction fails. Transactions have consistency if the execution of the transactions in an interleaved manner is equivalent to serial execution of the transactions in a particular order. A transaction has isolation if it is indiscernible to others until the transaction is committed successfully. A transaction has durability if the results of the transaction are permanent, even if a failure occurs after the transaction is committed. The ACID properties can therefore ensure that data is consistently and predictably stored in a database in response to database transactions, and in spite of any failures in the overlying computer system.

Relational databases can store data in the form of various relations between different types of data. Relational databases may be designed to have the ACID properties. In some examples, a relational database can include one or more tables, and each table may have one or more rows with one or more columns. A unique key identifying each row may be defined within the relational database. In some cases, this unique key may be a primary key.

Various organizations use relational databases, as well as other types of data records, to store important information. For example, businesses may store customer information in relational databases. Banks may store important account information in relational databases. Schools may store student test scores in relational databases. As the importance of data increases for organizations, and the amount of data stored by organizations increases, various techniques for storing data accurately and efficiently may be widely applicable.

In various networked environments, a primary system may maintain a base database, while one or more downstream systems may maintain one or more derived databases that include at least some of the information stored in the base database. For example, the base database may be a master database that includes entries in multiple tables, and one or more downstream systems may have derived databases that are based on copies of some or all of the tables of the base database.

Tables of the base database may include a variety of different entries, which may be changed over time. For instance, entries in the base database may be added, deleted, or updated over time. As the base database changes over time, one or more associated derived databases, maintained by downstream systems, may also be updated in accordance with the changes to the base database.

However, updating a derived database every time the base database is modified can be inefficient. For instance, a single entry in the base database may be modified multiple times over the course of a day. In situations where the derived database only requires accuracy at the end of each day, updating the derived database every time the base database is updated would cause the derived database to be unnecessarily modified throughout the day. Further, if updating the derived database involves transmissions over a bandwidth-limited communication network, those unnecessary updates may unnecessarily expend resources of the communication network.

A possible alternative technique for updating a derived database based on changes to the base database can include batch updates, in which the derived database may be updated periodically. For example, the derived database may be updated once every day in advance of a daily event. However, in some cases, these batch updates can involve sending aversion of each data entry in the base database. In cases in which the base database and/or the derived database maintain a substantial amount of data, sending each data entry of the updated base database can be incredibly taxing on the intermediary communication network. In some cases, the communication network may fail to transmit the data or experience an outage that may prevent transmission of other data across the communication network.

Other alternative techniques may rely on transaction logs or change journals that include information sequentially tracking each individual change to a base database. Such transaction logs or change journals can then be used to replicate all of the individual logged changes in a derived databased or another copy of the base database, or to revert to earlier versions of the base database. For example, such transaction logs are often used in database synchronization or recovery systems. However, transaction logs or change journals are generally stored as a binary file, or other format, that must then be parsed to identify each individual change to a database. Additionally, some systems that use transaction logs or change journals delete information about database changes, after logged changes to a source database have been applied to another copy of the database.

Accordingly, in systems that use transaction logs or change journals, downstream systems may not be able to submit queries to retrieve information about changes to specific tables of a base database, or submit queries to retrieve only the most recent version of records that may have one or more intervening changes since the last update. Additionally, in such systems, different downstream systems may not be able to submit queries for different sets of changes to a base database, or submit queries for changes to the base database that occurred during different time periods.

The example systems and methods described herein may be directed toward mitigating or overcoming one or more of the deficiencies described above.

SUMMARY

This disclosure describes systems, devices, and techniques for efficiently tracking and/or reporting changes to a database over time. Various problems associated with updating a derived record (e.g., a derived database) based on a base record (e.g., a base database) can be addressed by utilizing a change record. The change record be a separate database with entries that track individual changes to the base record over time. For example, when a base entry in the base record is added, deleted, or updated, a corresponding change entry in the change record can indicate the time and type of change that has occurred. The change record itself can be queried by downstream systems that maintain derived records, such that the downstream systems can retrieve information about changes to the base record and update the derived records based on those changes to the base record. In some cases, different downstream systems may submit different queries to retrieve information from the change record about changes to different sets of tables within the base record, and/or changes that occurred during different periods of time. Some downstream systems may use such queries associated with the change record to retrieve the most recent versions of changed entries in the base record, while auditing system or other downstream systems may use queries associated with the change record to retrieve more granular indications of individual changes to the base record.

According to a first aspect, one or more computing devices can include at least one processor and memory storing a change database and computer-executable instructions that, when executed by the at least one processor, cause the at least one processor to perform operations. The operations can include identifying changes to base entries of a base database, and identifying times of the changes to the base entries. The operations can also include storing, in the change database, change entries corresponding to the changes to the base entries, wherein the change entries include data associated with the base entries, timestamps associated with the times of the changes, and indications of change types of the changes. The operations can additionally include receiving an external query from an external system that maintains a derived database associated with the base database. The operations can further include selecting a set of one or more selected change entries, from the change entries in the change database, based on the external query, and transmitting updated data associated with the set of one or more selected change entries to the external system.

According to a second aspect, a computer-implemented method can include identifying, by one or more processors, a first change to a base entry of a base record, and storing, by the one or more processors, and in a change record, a first change entry indicating the first change to the base entry and a first time of the first change. The method can also include identifying, by the one or more processors, a second change to the base entry of the base record, and storing, by the one or more processors, and in the change record, a second change entry indicating the second change to the base entry and a second time of the first change, wherein the second time is later than the first time. The method can also include receiving, by the one or more processors, an external query from an external system that maintains a derived database associated with the base record. The method can further include transmitting, by the one or more processors, updated data to the external system in response to the external query. The updated data can omit first data selected from the first change entry, and include second data selected from the second change entry.

According to a third aspect, one or more non-transitory computer-readable media can store computer-executable instructions that, when executed by one or more processors, cause the one or more processors to perform operations. The operations can include identifying changes to base entries of a base record, and identifying times of the changes to the base entries. The operations can also include storing, in a change record, change entries corresponding to the changes to the base entries, wherein the change entries include data associated with the base entries, timestamps associated with the times of the changes, and indications of change types of the changes. The operations can further include receiving a first external query from a first external system that maintains a first derived record associated with the base record, wherein the first external query requests a first set of change entries associated with changes to the base record that occurred between a first time and a second time. The operations can also include transmitting first updated data to the first external system, the first updated data including a first set of change entries, selected from the change record, with timestamps between the first time and the second time. The operations can additionally include receiving a second external query from a second external system that maintains a second derived record associated with the base record, wherein the second external query requests a second set of change entries associated with changes to the base record that occurred between a third time and a fourth time. The operations can also include transmitting second updated data to the second external system, the second updated data including a second set of change entries, selected from the change record, with timestamps between the third time and the fourth time.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2A shows an example base record.

FIG. 2B shows an example change record.

FIGS. 3A to 3D show an example in which a base record, a change record, and examples of updated data can be used to update derived records over time based on the change record.

DETAILED DESCRIPTION

Figure 1:
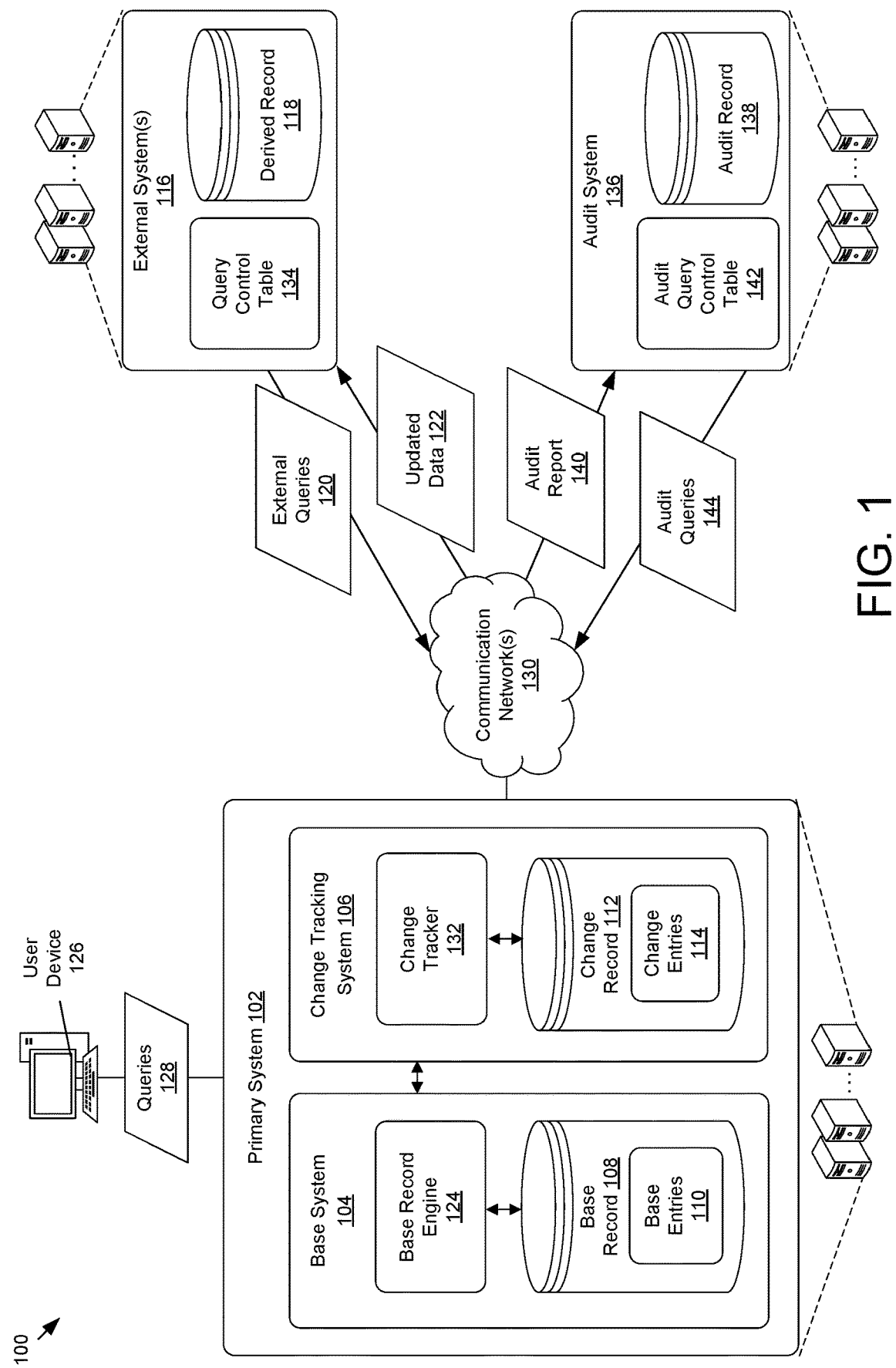
FIG. 1 shows an example of a system that is configured to track changes to a data record over time, and to update at least one corresponding data record based on the tracked changes.

FIG. 1 shows an example of a system 100 that is configured to track changes to a data record over time, and to update at least one corresponding data record based on the tracked changes. The system 100 can have a primary system 102 that includes a base system 104 and a change tracking system 106. The base system 104 can include a base record 108 that includes one or more base entries 110. The change tracking system 106 can be configured to track changes to the base record 108 over time, and maintain a change record 112 that includes change entries 114 corresponding to the changes to the base record 108. The system 100 can also have at least one external system 116 that maintains a derived record 118 corresponding to at least a portion of the base record 108. The change tracking system 106 can be configured to receive external queries 120 from external systems, and transmit updated data 122 to the external systems that includes portions of the change record 112 selected based on the external queries 120. The external systems can use the updated data 122 to update derived records.

Elements of the primary system 102 and/or external systems may be implemented by one or more physical computing devices (e.g., computers, servers, or the like), virtual computing elements, and/or other types of computing elements or computing devices. For example, the primary system 102 and/or the external systems, may be embodied in hardware, software, or a combination thereof. An example system architecture for a computing device that can execute one or more elements of the primary system 102 and/or one or more external systems is described below with respect to FIG. 5.

The base record 108 stored by the base system 104 can be a database, data record, datastore, or other type of data structure configured to store and/or organize data in memory. As used herein, the terms "base record," "base database," "base datastore," or their equivalents, can refer to memory and/or a collection of data stored in memory that can be accessed via one or more computing devices.

The base record 108 may store one or more base entries 110. Any one of the base entries 110 may include one or more discrete pieces of data. For example, each one of the base entries 110 may include at least one number (e.g., a floating-point number), integer, string, character, Boolean, or some other data type. In some examples, the base entries 110 may omit complex data types, such as image files, audio files, video files, or the like. However, in other examples, the base entries 110 may include such complex data types.

In some examples, the base record 108 may be a relational database. The relational database may have one or more tables of base entries 110. In some cases, a base entry within the base record 108 may be stored in a table and be associated with a primary key. As used herein, the term "primary key" can refer to at least one element of each entry within a table that uniquely identifies the entry. In some examples, the primary key may correspond with one or more columns within the table that contains unique data, such that unique data in those columns can be used to uniquely identify each row within the table of the base record 108. For instance, an example one of the base entries 110 may include an identifier that uniquely identifies the base entry within the base record 108. Each one of the base entries 110 may be associated with a different identifier. Accordingly, each identifier may uniquely correspond to one of the base entries 110 within the base record 108.

In some examples, the base system 104 can include a base record engine 124. The base record engine 124 may be configured to manage and/or modify data within the base record 108. For instance, the base record engine 124 can be configured to create, read, update, and/or delete (CRUD) data in the base record 108, such as in any element within the base entries 110 of the base record 108. The base record engine 124 may include at least one software component. In various examples, the base record engine 124 may be a DBMS, database engine, and/or other type of database manager.

In various examples, the base record engine 124 may be configured to CRUD data stored in the base record 108 in response to instructions from an external source, such as a user device 126. As used herein, the term "user device," and its equivalents, can refer to any computing device configured to receive user instructions, and/or communicate (e.g., exchange data) with an external computing system, such as the primary system 102. Examples of user devices can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange digital data over a network. Additional examples of user devices include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange digital data over a network.

In some examples, the user device 126 may be associated with the base record 108. For example, the base record 108 may be maintained by an organization (e.g., a business), and the user device 126 may be associated with an administrator account or other user account associated with the organization.

The user device 126 and/or other external sources may transmit, to the base system 104, queries 128 associated with the base record 108. As used herein, the terms "query," "database query," and their equivalents, can refer to a request to modify and/or read data in a data record (e.g., a database). In some cases, a query can be used to execute one or more database transactions that satisfy the ACID transaction properties. A single query can be a request to modify and/or read data in one or more entries within the data record. In some cases, the base system 104 can provide an Application Programming Interface (API) by which the user device 126, or other external sources, can provide the queries 128 to the base system 104. In some cases, the queries 128 can be in the form of a programming language associated with the base system 104 and/or the base record 108, such as Structured Query Language (SQL), JavaScript Object Notation (JSON), or the like.

Upon receiving any one of the queries 128, the base record engine 124 may be configured to perform at least one action. For example, a first query among the queries 128 may be a request to read at least a portion of a specific base entry among the base entries 110. The first query may identify the specific base entry (e.g., the first query may identify a primary key associated with the specific base entry, and/or a table associated with the specific base entry). In response to receiving the first query, the base record engine 124 may be configured to extract data from the specific base entry in the base record 108, and may transmit a response (not illustrated) to the user device 126, or another external source of the query, that includes the extracted data. The queries 128 and/or corresponding responses may be in the form of one or more data packets exchanged between the primary system 102 and the user device 126 or other external sources of queries 128.

One or more types of queries 128 may be requests to change the base record 108. For example, the queries 128 may include a request to create a new base entry in a table of the base record 108, a request to delete an existing base entry in the base record 108, and/or a request to update an existing base entry of the base record 108. In some instances, a first query among the queries 128 may be a request to add a new base entry to the base entries 110. The first query may include or otherwise specify data to be included in the new base entry. In response to receiving the first query, the base record engine 124 may be configured to create the new base entry in the base record 108 with the specified data. In some cases, a second query among the queries 128 may be a request to delete an existing base entry from the base entries 110. The second query may identify the existing base entry (e.g., the second query may include a primary key associated with the existing entry). In response to receiving the second query, the base record engine 124 may be configured to delete the existing base entry from the base record 108. According to some examples, a third query among the queries 128 may be a request to update at least one element of a specified base entry within the base entries 110. The third query may identify the specified base entry (e.g., the third query may include a primary key associated with the existing base entry) and a specified update to the specified base entry, such as a requested update to one or more columns of the specified base entry. In response to receiving the third query, the base record engine 124 may be configured to modify at least one element of the specified base entry in accordance with the specified update. Up-to-date, modified data can accordingly be stored in the base record 108, based on the queries 128.

As will be discussed further below, the primary system 102 may exchange data with one or more external systems 116 via one or more communication networks 130. The communication network(s) 130 may include at least one wired network, at least one wireless network, or a combination thereof. In various examples, the communication network(s) 130 can include any network configured to transfer data between the primary system 102 and one or more external systems 116. The data may be transferred, for example, in the form of at least one data packet (e.g., at least one Internet Protocol (IP) data packet). In various cases, the communication network(s) 130 include at least one of a wired fiber network, a multistage circuit-switching network (e.g., a Clos topology network), or the like, over which the data can be transmitted via optical and/or electrical signaling. In some examples, the communication network(s) 130 include at least one radio network (e.g., a Wireless Local Area Network (WLAN), a Radio Access Network (RAN), or the like) over which the data can be transmitted via electromagnetic signaling. According to some implementations, the communication network(s) 130 can include at least one Virtual Private Network (VPN) that can traverse one or more public networks (e.g., the Internet) and can support secure data transfer over at least one public network (e.g., the Internet).

In various examples, the communication network(s) 130 may include a limited amount of communication resources that can be used to transfer data. For instance, the communication network(s) 130 may have limited bandwidth. The amount of the communication resources of the communication network(s) 130 can be referred to as "capacity." The term "available capacity" may refer to a difference between a total amount of capacity associated with the communication network(s) 130 and an amount of the capacity used to support data transmission at a given time. When the communication network(s) 130 have less than a threshold amount of available capacity, the communication network(s) 130 may be considered "congested." When the communication network(s) 130 are congested, the data transmitted through the communication network(s) 130 may be susceptible to acquiring errors during transmission or may even fail to reach its intended destination. In some extreme examples, congestion may cause the communication network(s) 130 to fail (e.g., become disconnected).

As discussed above, at least one external system 116 can maintain a derived record 118. Similar to the base record 108 and/or the change record 112, the derived record 118 can be a database, data record, datastore, or other type of data structure configured to store and/or organize data in memory. As used herein, the terms "derived record," "derived database," "derived datastore," or their equivalents, can refer to memory and/or a collection of data stored in memory that can be accessed via one or more computing devices.

The derived record 118 can correspond to at least a portion of the base record 108. For example, the derived record 118 can correspond to some or all of the tables of the base record 108. In some examples, multiple external systems 116 may each maintain a different derived record that corresponds to at least a portion of the base record. However, in some cases, derived records maintained by different external systems 116 may differ in one or more ways. For instance, if the base record 108 includes thirty different tables, a first derived record maintained by a first external system may correspond to all thirty of the tables of the base record 108, such that the first derived record is substantially a copy of the base record 108. However, a second derived record maintained by a second external system may correspond to five specific tables of the base record 108, such that the second derived record corresponds to a partial copy of the base record 108.

In some examples, data in the derived record 118 may become inaccurate or out-of-date when data in the base record 108 is changed (e.g., in response to one or more queries 128). In order to ensure that the data in the derived record 118 accurately reflects the data in the base record 108, the data in the derived record 118 may be at least occasionally updated based on the data in the base record 108. For example, the primary system 102 can transmit updated data 122 to an external system over the communication network(s) 130. The updated data 122 may be transmitted in the form of a "report," which may represent one or more data packets indicating the updated data 122. The external system can accordingly update the derived record 118 based on the updated data 122, such that the derived record 118 is updated to reflect changes that have occurred at the base record 108.

Data associated with the base record 108 may, in some cases, include megabytes, gigabytes, terabytes, or even larger amounts of data. Updates to the base record 108 over time may similarly be associated with megabytes, gigabytes, terabytes, or even larger amounts of data. Accordingly, if data regarding all updates to the base record 108 were transmitted between the primary system 102 and one or more external systems 116, particularly on a repeated and/or periodic basis, the amount of transferred data could interfere with the functioning of the communication network(s) 130.

However, to lower the amount of data sent between the primary system 102 and one or more external systems 116 over the communication network(s) 130, and to correspondingly reduce bandwidth usage and lower network loads, the updated data 122 sent by the primary system 102 to external systems can be based on changes to the base record 108 that are reflected in the change record 112. In particular, an external system may send one or more external queries 120 to the change tracking system 106 via the communication network(s) 130, and the change tracking system 106 can return updated data 122, corresponding to the external queries 120, to the external system via the communication network(s) 130. For instance, an external query from an external system may request updated information associated one or more specific tables of the base record 108, and/or associated with a particular window of time. Rather than returning information about all updates to the base record 108 to the external system, the change tracking system 106 can return a smaller amount of information that corresponds to the specific tables and/or window of time identified in the external query.

Accordingly, the change tracking system 106 within the primary system 102 can reduce the burden of data updates on the communication network(s) 130, by providing updated data 122 based on the change record 112. The change record 112 can be a database, data record, datastore, or other type of data structure configured to store and/or organize data in memory. As used herein, the terms "change record," "change database," or their equivalents, can refer to a stored collection of data that indicates changes made to entries within a base record. The change record 112 may include various change entries 114 that indicate changes to respectively corresponding base entries 110 within the base record 108. In some examples, the base record 108 can be a first database managed by the base system 104, while the change record 112 can be a separate, second database managed by the change tracking system 106. In some examples, the base record 108 and the change record 112 can both be relational databases, such as SQL-based databases.

The change tracking system 106 may include a change tracker 132, which may be configured to manage the change record 112. In some examples, the change tracker 132 can be a database engine, and the change record 112 can be a corresponding relational database. For instance, the change tracking system 106 and/or the change tracker 132 can include a DBMS, database engine, and/or other type of database manager. As discussed above, elements of the primary system 102, including elements of the base system 104 and/or the change tracking system 106, can be implemented by software, hardware, or a combination thereof.

The change tracker 132 may be configured to identify changes to the base record 108 that occur over time. For instance, in some examples, the change tracker 132 may periodically scan the base record 108 in order to identify changes to the base record 108 that have occurred between scans. In other examples, the change tracker 132 may receive indications from the base record engine 124 corresponding to each change implemented by the base record engine 124 in the base record 108. For example, the base record engine 124 may be configured to report, to the change tracker 132, any changes it implements in response to queries 128.

The change tracker 132 may store indications of the changes to the base record 108 in the change entries 114 of the change record 112. In some cases, a given change entry within the change entries 114 may correspond to a given base entry within the base entries 110. For example, the change entry may include data stored in the corresponding base entry after the corresponding base entry has been changed. In some cases, the change record 112 may store multiple change entries corresponding to a single base entry stored in the base record 108. In some implementations, each change entry may include a timestamp corresponding to a time at which the corresponding base entry was modified. Accordingly, the change entries 114 of the change record 112 can be used to track when and how the base entries 110 have been changed over time. Additionally, the most recent change to each base entry can be efficiently identified using the timestamps of corresponding change entries. For instance, the most recent change entry can be identified by identifying, among all change entries corresponding to a given base entry, the change entry with the latest timestamp.

The change tracker 132 may be configured to detect and track various types of changes to the base record 108, including additions of new base entries 110 to the base record 108, deletions of base entries 110 from the base record 108, and/or updates that edit existing base entries 110 in the base record 108. As a first example, the change tracker 132 may identify that a new base entry has been added to the base record 108. Based on the identification of the new base entry, the change tracker 132 may generate and add a new change entry to the change record 112. The new change entry may include the data (e.g., the elements) of the new base entry. Further, the new change entry may include a change type element, or other type of additional element, that indicates the new base entry has been added to the base record 108. The new change entry may also include a timestamp element, or other type of element, that indicates the time at which the new base entry was added to the base record 108.

As a second example, the change tracker 132 may identify that a previously-existing base entry has been deleted from the base record 108. Based on the identification that the previous base entry has been deleted, the change tracker 132 may add a new change entry to the change record 112 that corresponds to the deletion of the previous base entry in the base record 108. The new change entry may include at least a portion (e.g., at least the primary key) of the previous base entry that has been deleted from the base record 108. The new change entry may include a change type element, or other type of additional element, that indicates that the previous base entry has been deleted from the base record 108. Further, the new change entry may include a timestamp, or other type of element, that indicates the time at which the previous base entry was deleted from the base record 108.

As a third example, the change tracker 132 may identify that an existing base entry has been updated in the base record 108. Based on the identification that the existing base entry has been updated, the change tracker 132 may add a new change entry to the change record 112 that corresponds to the update of the existing base entry. The new change entry may include at least the updated data in the existing base entry. In some cases, the new change entry may also include a change type element, or other type of additional element, that indicates that the existing base entry has been updated in the base record 108. The new change entry may further include a timestamp, or other type of element, that indicates the time at which the existing base entry was updated in the base record 108.

The change record 112 may accordingly capture all changes, that have been performed on the base entries 110 over a period of time, in the change entries 114 of the change record 112. The change tracker 132 can maintain change entries 114 associated with previous changes to the base record 108 for at least a threshold period of time, such as a period of weeks, months, or years. In some examples, the change tracker 132 can be configured to maintain individual change entries 114 for at least a predefined audit or compliance period after the individual change entries 114 are added to the change record 112. The change tracker 132 may also, in some examples, be configured to periodically or occasionally delete change entries 114 that are older than a threshold age (e.g., were added to the change record 112 more than a threshold time ago), or delete the oldest change entries 114 when the size of the change record 112 grows to above a threshold size. Thus, in some examples, the size of the change record 112 can be limited. Due to such limits on the size of the change record 112, memory storing the change record can be conserved.

One or more external systems 116 may periodically or occasionally transmit external queries 120 to the change tracking system 106. Similar to the queries 128 that may be received by the base system 104, the external queries 120 may be database queries or other requests to retrieve data stored in the change record 112. In some cases, the change tracking system 106 can provide an API by which the external systems 116 can provide the external queries 120 to the change tracking system 106. In some cases, the external queries 120 can be in the form of a programming language associated with the change tracking system 106 and/or the change record 112, such as SQL, JSON, or the like. For example, an external query may be a SQL command, such as a SELECT command, that requests data stored in one or more change entries 114 of the change record 112. In some examples, the change tracker 132, or other elements of the change tracking system 106, may be configured to not accept or process external queries 120 that attempt to modify data in the change record 112, but may be configured to accept and process external queries 120 that attempt to read data in the change record 112.

The change tracker 132 can be configured to identify a set of change entries 114 in the change record 112 that correspond to external queries 120 received from external systems 116. The change tracker 132 can accordingly provide the external systems with updated data 122 based on the identified set of change entries 114.

As a first example, if an external system submits an external query that requests information about updates to the base record 108 that have occurred in the last day, the change tracker 132 can identify change entries 114 in the change record 112 with timestamps in the last day. The change tracker 132 can accordingly return updated data 122 to the external system based on the change entries 114 with timestamps in the last day.

As a second example, an external system may obtain updated data corresponding to change entries 114 up to change entry n in the change record 112. At a later time, the external system 116 may submit a new external query that identifies an entry number of "n" and requests new updated data corresponding to all available newer change entries with entry numbers of n+1 and higher. In this example, the change tracker 132 can identify a set of change entries 114 in the change record 112 that have entry numbers higher than the entry number of "n" specified in the external query, and may transmit updated data 122 to the external system 116 based on the identified set of change entries 114.

As a third example, an external system may submit an external query that identifies a specific set of one or more tables in the base record 108, and requests updated data 122 associated with the identified set of one or more tables over a requested time period and/or based on entry numbers of corresponding change entries 114. The change tracker 132 can accordingly identify a set of change entries 114 in the change record 112 that correspond to the set of one or more tables identified in the external query, and can return updated data 122 to the external system based on the identified set of change entries 114.

The external systems 116 may each store a query control table 134 that tracks information associated with the most recent updated data received from the change tracking system 106. For example, the query control table 134 maintained by an external system may indicate a timestamp of the most recent updated data 122 received from the change tracking system 106. Accordingly, the external system may use the query control table 134 to format the next external query sent to the change tracking system 106, for instance to request new updated data corresponding to a time period between the timestamp stored in the query control table 134 and the time the next external query is sent. As another example, the query control table 134 may indicate an entry number of the highest-numbered change entry 114 associated with the last updated data received from the change tracking system 106. Accordingly, the external system may use the query control table 134 to format the next external query sent to the change tracking system 106, for instance to request new updated data corresponding to newer change entries 114 with entry numbers in the change record 112 that are higher than the entry number stored in the query control table 134.

Different external systems 116 may submit different types of external queries 120, and/or may submit external queries 120 at different times or at different intervals. As discussed above, different external systems 116 may maintain different derived records, such as distinct derived records that correspond to different subsets of tables of the base record 108. Different external systems 116 may accordingly submit different external queries 120 that request updated data 122 based on different tables and/or different types of data. Different external systems 116 may also submit external queries 120 to the change tracking system 106 on different schedules. For instance, a first external system may be configured to submit an external query to the change tracking system 106 once a hour, a second external system may be configured to submit an external query to the change tracking system 106 once a day, and a third external system may be configured to submit an external query to the change tracking system 106 once a week.

As a non-limiting example, the base record 108 may be a master list of employee data that includes twenty different tables. In this example, a first external system may be a human resources (HR) system that maintains a first derived record that corresponds to all twenty of the tables in the base record 108, and is configured to update the first derived record once a day. The HR system may accordingly be configured to submit external queries 120 to the change tracking system 106 once a day that request updated data 122 associated with changes that have occurred in all twenty tables in the base record 108 since the last daily update. However, a second external system may be a data analytics system that maintains a second derived record that corresponds to five specific tables in the base record 108 that hold data relevant to employee performance metrics determined by the data analytics system. The data analytics system may be configured to update the second derived record every hour. The data analytics system may accordingly be configured to submit external queries 120 to the change tracking system 106 every hour that request updated data 122 associated with changes that have occurred in the five relevant tables in the base record 108 since the last hourly update.

When the change tracking system 106 sends updated data 122 to one or more external systems 116 based on one or more change entries 114 in the change record 112, the change tracking system 106 can continue to store those change entries 114 in the change record 112. Accordingly, because the change entries 114 can be maintained in the change record 112 even after sending corresponding updated data 122 to an external system, the change entries 114 can continue to be available in the change record 112 so that the change entries 114 can be queried by other external systems 116, and/or be continue to be available for auditing purposes or other purposes as discussed below.

The change tracker 132 can accordingly be configured to provide updated data 122 to one or more external systems 116 in response to external queries 120 received from the external systems 116. In other examples, the change tracker 132 may be configured to provide updated data 122 to one or more external systems 116 based on a reporting schedule or other scheduling data configured in memory at the change tracker 132. For example, the change tracker 132 may be configured to identify, based on the change record 112, which base entries 110 were modified during a reporting period and/or since the transmission of a previous set of updated data 122 to an external system. The change tracker 132 can accordingly transmit the updated data 122 periodically (e.g., once an hour, once a day, once a week, or some other reporting period) or at other scheduled times in order to ensure that one or more derived records reflect ongoing changes to the data in the base record 108.

Timestamps associated with change entries 114 in the change record 112 can allow the change tracker 132 to efficiently and accurately identify all changes to the base record 108 that occurred within a particular time period. For example, if the derived record 118 was previously updated at a first time and is to be updated at a second time, the change record 112 can be used to identify which entries within the base record 108 have been changed between the first time and the second time, and which entries have been unmodified between the first time and the second time. As a result, the derived record 118 can be updated by transmitting entries that have changed since the last update to the derived record 118 as updated data 122, without transmitting other entries that have not been changed since the last update. Accordingly, the derived record 118 can be accurately updated without transmitting the entire set of data within the base record 108 over the communication network(s) 130, which may reduce the amount of data transmitted over the communication network(s) 130 relative to sending the entire set of data within the base record 108.

In some examples, the change tracker 132 may further reduce the amount of data transmitted over the communication network(s) 130 by identifying, based on the change record 112, the most recent version of a base entry at the time updated data 122 is transmitted to an external system. For instance, the change tracker 132 may identify only the most recent version of the base entries 110, based on changes that occurred during a reporting period or since updated data 122 was last sent to a particular external system. The change tracker 132 may, for instance, can have a view that exposes the last change to each element of the base entries 110 per reporting period. Thus, the change tracker 132 can ignore multiple changes to the same base entry per reporting period, and exclusively report the most recent version of that base entry as updated data 122 during each reporting period. For instance, if a single base entry was changed twice during a reporting period, the change tracker 132 may have added two corresponding change entries 114 to the change record 112. However, because the second of those two added change entries 114 may reflect both changes to the base entry, the change tracker 132 may be configured to ignore the earlier change entry and instead exclusively use the later, more recent change entry to build updated data 122 for the reporting period.

As an example, a base entry may initially store the value "John," and a derived record may be initialized to include a copy of the base entry that stores "John." A first change entry can be generated and added to the change record 112 in response to the base entry being updated to store "Joe" instead of "John." Subsequently, a second change entry can be generated and added to the change record 112 in response to the base entry being updated a second time to store "Steve" instead of "Joe." A derived record may be updated by transmitting updated data 122 based on only the most recent change entry—that is, the second change entry indicating that the base entry now stores "Steve." The derived record can accordingly be fully updated to reflect the current state of the base record, based on the updated data 122 indicating that the base record was most recently changed to store "Steve," without transmitting the intermediary, first change entry still present in the change record 112 that indicates that the base record had previously been updated to store "Joe" instead of the initial value of "John." By transmitting updated data 122 based on the most recent change entries 114 associated with individual base entries 110, without transmitting data associated with older change entries 114 associated with the same base entries 110 during the same reporting period, the size of the updated data 122 that is sent over the communication network(s) 130 and used to update derived records can be limited.

Accordingly, based on identified change entries 114 corresponding to an external query or a reporting period, the change tracker 132 may be configured to generate a new set of the updated data 122 that reflects the changes to the base record 108 during the reporting period and/or since the last set of updated data 122 was transmitted. In various examples, the change tracker 132 may generate the new set of the updated data 122 to omit data from base entries 110 in the base record 108 that have been maintained (e.g., unmodified) during the reporting period and/or since the last set of updated data 122 was transmitted. Accordingly, the derived record 118 can be accurately updated with ongoing changes to the base record 108, and the total size of the updated data 122 can be reduced to eliminate or reduce detrimental impacts of transmitting the updated data 122 over the communication network(s) 130.

As shown in FIG. 1, the system 100 may in some examples also include an audit system 136. The audit system 136 may be an external system, similar to the external systems 116, that is in communication with the primary system 102 via the communication network(s) 130. The audit system 136 can maintain an audit record 138. The audit record 138 may, similar to the derived record 118, be a database, data record, datastore, or other type of data structure configured to store and/or organize data in memory. As used herein, the terms "audit record," "audit database," "audit datastore," or their equivalents, can refer to memory and/or a collection of data stored in memory that can be accessed via one or more computing devices.

The audit record 138 may be configured to store copies of all of the change entries 114 in the change record 112 corresponding to a period of time. Accordingly, while the change tracker 132 may be configured to provide updated data 122 to other types of external systems based on the most recent change entries 114 associated with base entries 110, the change tracker 132 may be configured to provide an audit report 140 to the audit system 136 that includes all of the change entries 114 associated with base entries 110 that have been added to the change record 112 since the last audit report 140, including any intermediate change entries 114 that no longer reflect the most up-to-date state of base entries 110. The audit system 136 can use the audit report 140 to update the audit record 138 to include various entries corresponding to changes to the base record 108. The audit system 136 may refrain from overriding existing entries in the audit record 138 that correspond to previous changes to the base record 108. Accordingly, the audit record 138 may include multiple entries corresponding to changes to the same base entry among the base entries 110.

For instance, in the example discussed above in which a base record is updated a first time to change a value from "John" to "Joe," and is then updated a second time to change the value from "Joe" to "Steve," the audit report 140 can include a copy of a first change entry associated with the change from "John" to "Joe," and also include a copy of a second change entry associated with the change from "Joe" to "Steve." Accordingly, while updated data 122 provided to one or more external systems 116 may be based only on the second, more recent change entry as discussed above, the audit report 140 can include the most recent change entry as well as any earlier change entries 114 associated with the same base entry that have not yet been provided to the audit system 136. Accordingly, the audit record 138 can be updated with more granular information about individual changes to the base record 108 that occurred at different times, which may be useful for auditing or compliance purposes. For instance, an analyst may use the audit record 138 to identify a series of specific changes that were made to a particular base record over a certain period of time.

In some examples, the audit system 136 may have an audit query control table 142, similar to the query control table 134 discussed above. The audit query control table 142 may track information associated with the most recent audit report 140 data received from the change tracking system 106, and enable the audit system 136 to generate and send audit queries 144 to the change tracking system 106 that request more recent change entries 114. Similar to external queries 120, audit queries 144 may be SQL queries or other types of requests for change entries 114 with timestamps in a specified window of time and/or with entry numbers above a specified entry number. In other examples, the change tracking system 106 may be configured to transmit the audit report 140 to the audit system 136 in response to identifying that a change has been made to any of the base entries 110, periodically, on a scheduled basis, or in response to some other event. Although FIG. 1 shows the audit report 140 being transmitted over the communication network(s) 130, in some cases the audit report 140 can be transmitted over one or more different communication networks than the updated data 122.

The audit record 138 may provide entities, such as accounting or legal departments, with an ongoing record of individual changes made to the base record 108 over time. The change record 112 can accordingly be utilized to update the audit record 138, and thereby provide an audit trail of changes to the base record 108 over time. For example, it may be advantageous for a legal team associated with an entity to identify what types of changes were performed on the base record 108 over time in preparation for litigation associated with the information stored in the base record 108.

In some examples, other types of external systems may also receive the audit report 140, or versions of the audit report 140 that include copies of all change entries 114 associated with base entries 110, rather than the most recent change entry associated with each of those base entries 110. For example, a real-time threat assessment system may be configured to request and/or receive audit reports, or similar reports, from the change tracking system 106 that indicate new change entries 114 in a near-real-time basis as changes are made to the base record 108, such that the threat assessment system can evaluate the change entries 114 to detect data security issues or other issues.

In various examples, the change record 112 can be used to track changes in various types of databases. For instance, an entity may be associated with a heterogenous database environment, including multiple databases managed by different types of database engines. Various examples of the change record 112, as described herein, can be applied to the different types of database engines and provide a universal methodology for tracking changes throughout the heterogeneous database environment.

The system 100 described herein can address specific problems associated with computer networks. For example, the change record 112 can be utilized to reduce impacts on communication network(s) 130 carrying signals used to update derived records, as discussed above. The change record 112 can also enable different external systems 116 to query and receive different updated data 122, so that the different external systems 116 can each independently update corresponding derived records based on changes to the base record 108 that are relevant to each different external system.

FIG. 2A shows an example base record 200, such as the base record 108 described above with reference to FIG. 1. The base record 200 may include n base entries, wherein n is a positive integer. The n base entries of the base record 200 may correspond to the base entries 110 described above with reference to FIG. 1.

The base entries of the base record 200 can include at least two data fields: an identifier 202 and content 204. Each of the identifier 202 and the content 204 may include one or more discrete elements of data (e.g., a floating-point number, integer, string, character, Boolean, or some other data type). In some cases, the elements can be arranged in one or more respective columns in the base record 200. For example, the base record 200 can represent data stored in a relational database.

The identifier 202 of an example base entry may uniquely identify the base entry within the base record 200. For example, as illustrated in FIG. 2A, a first base entry in the base record 200 can be identified by "Identifier 1," a second base entry in the base record 200 can be identified by "Identifier 2," and the nth base entry in the base record 200 can be identified by "Identifier n." In various cases, the identifier 202 data field can represent a primary key of the base record 200. Accordingly, no two base entries within the base record 200 may share the same identifier 202. The identifier 202 of each base entry may be unmodifiable, in some cases. For instance, the identifier 202 of a base entry may be generated when the base entry is added to the base record 200 and may not be updated as long as the base entry is included in the base record 200.

The content 204 of an example base entry may include one or more data elements that can be modified, e.g., in response to queries. For example, the content 204 can include substantive data of the corresponding base entry. The content 204 of the base entry may be associated with one or more columns of the base entry. In some cases, values of the content 204 can be duplicative over multiple base entries within the base record 200. For example, two base entries may share the same content 204.

In various implementations, the base record 200 may be changed over time. For instance, base entries may be added, modified, or deleted in the base record 200 in response to queries, such as queries 128. According to various examples, the identifier 202 of each base entry remaining in the base record 200 may remain unmodified. However, the content 204 may be modified over time.

In some examples, one or more derived records may be maintained at one or more external systems based on the base record 200. A derived record may include copies of some or all of the base entries. However, in order to update a derived record based on ongoing changes to the base record 200, each change to the base record 200 may be tracked over time in a change record as described herein, such that updated data associated with the changes can be used to update the derived record.

FIG. 2B shows an example change record 206, such as the change record 112 described above with reference to FIG. 1. The change record 206 may include p=m–k change entries, wherein p is a positive integer, m is a positive integer, k is a positive integer, and m–k is a positive integer. The p=m–k change entries of the change record 206 may correspond to the change entries 114 described above with reference to FIG. 1. In some cases, p=m–k may be a different value than n, as described above with reference to FIG. 2A. That is, the change record 206 may include a greater number, or the same number, of entries as the base record 200.

In various examples, each change entry of the change record 206 may indicate a respective change to one of the base entries in the base record 200. A single change entry in the change record 206 may correspond to a single change to a single base entry in the base record 200. If a particular base entry has been changed more than once, the change record 206 may include multiple change entries corresponding to the multiple changes to the particular base entry.

In various cases, an example change entry may include an identifier 202 of a corresponding base entry (not illustrated), and may also include modified content 204 of the corresponding base entry. The set of change entries within the change record 206 can represent a complete set of the changes to the various base entries within the base record 200. For instance, a given change entry, which may include "Identifier m" and "Content m," may include the identifier 202 and content 204 of a corresponding mth base entry among the n base entries in the base record 200, or a corresponding base entry that has been deleted from the base record 200, wherein the corresponding base entry has been changed (e.g., added, updated, or deleted). For instance, the Identifier m may be one of the Identifiers 1 to n stored in the base record. In some cases, multiple change entries within the change record 206 can correspond to the same Identifier m, respectively corresponding to multiple changes that have occurred to the base entry associated with Identifier m over time.

Further, each change entry in the change record 206 can include a change type 208, a timestamp 210, and an entry identifier (ID) 212, which provide further details about each change to the base entries in the base record 200. The change type 208 of an example change entry in the change record 206 may indicate a type of change made to the corresponding base entry in the base record 200, such as an addition of the base entry to the base record 200, a deletion of the base entry from the base record 200, or an update to change content 204 of the base entry. For example, as illustrated in FIG. 2B, the mth change entry includes a change type 208 of "Type m," which may indicate an addition of the corresponding base entry to the base record 200, an update to data within the corresponding base entry, or a deletion of the corresponding base entry from the base record 200.

The timestamp 210 of each change entry may indicate a time at which the corresponding change occurred to each corresponding base entry. For example, the mth change entry may indicate an update of data within the content 204 of the corresponding base entry in the base record 200. As depicted in FIG. 2B, the timestamp 210 of the mth change entry may be "Time m," which may indicate the time at which the content 204 of the corresponding base entry has been updated. As noted above, the change record 206 may include multiple change entries associated with different changes to the same base entry. Accordingly, different change entries in the change record 206 that are associated with the same base entry may have different timestamps indicating that the base entry was changed at different times.

The entry ID 212 of each change entry may identify the corresponding change entry within the change record 206. For example, the entry ID 212 may correspond to a primary key of the change record 206. In some instances, the entry ID 212 may include a number that uniquely identifies each change entry in the change record 206. That is, the entry ID 212 "Entry 1" may be different than the entry ID 212 "Entry 2," and so on. The change record 206 may include p entry IDs 212. In some instances, the change entry corresponding to the entry ID 212 "Entry 1" may correspond to the number "1," the change entry corresponding to the entry ID 212 "Entry 2" may correspond to the number "2" and so on.

Examples of various implementations of the present disclosure will now be described with reference to FIGS. 3A to 3D. FIGS. 3A to 3D show an example 300 in which a base record, a change record, and examples of updated data can be used to update derived records over time based on the change record. In particular, FIGS. 3A to 3D illustrate non-limiting examples associated with census data.

FIG. 3A shows example 300 at a first time. For instance, the first time may be Jan. 12, 2020 at 00:00:01. As shown, a base record 302 may include a table including multiple base entries that correspond to different individuals. As illustrated, the base record 302 may include seven base entries at the first time.

Each one of the base entries may include data associated with four different fields: an identifier 304, a name 306, a birthdate 308, and an occupation 310. The seven base entries in the base record 302 may represent census records of seven different individuals. The identifier 304 of an example base entry among the base entries in the base record 302 may include a number that uniquely identifies the example base entry. As shown, the seven base entries have identifiers 304 defined as "1" through "7," respectively. In some cases, the identifiers 304 may represent primary keys of the base entries in the base record 302.

The name 306, the birthdate 308, and the occupation 310 of each base entry within the base record 302 may represent substantive, modifiable data within the base record 302. The name 306 of an example base entry in the base record 302 may identify the name of the individual associated with the example base entry. For example, as illustrated in FIG. 3A, the base entry with an identifier 304 of "6" may represent an individual whose name is "Louis Pasteur." The birthdate 308 of an example base entry in the base record 302 may represent the date of birth of the individual associated with the example base entry. For instance, as illustrated in FIG. 3A, the individual named "Louis Pasteur" may have been born on Dec. 27, 1822. The occupation 310 of an example base entry may represent an occupation of the individual associated with the example base entry. In the example illustrated in FIG. 3A, the individual named "Louis Pasteur" may have an occupation of "Biologist."

FIG. 3A also shows a change record 312 that corresponds to various modifications to the base record 302 that occurred before the first time. The change record 312 includes a table including multiple change entries that correspond to respective changes to the base record 302 prior to the first time. Each one of the change entries may include data associated with the corresponding modified base entry. That is, each one of the change entries may include the identifier 304, name 306, birthdate 308, and occupation 310 of the corresponding modified base entry. In addition, each one of the change entries may include additional fields, such as a change type 314, a timestamp 316, and an entry number 318.

The change type 314 of each of the change entries may indicate the type of change that occurred to the corresponding base entry. For instance, at the first time, the change entries of the change record 312 indicate the "Addition" change type 314, respectively corresponding to the addition of the seven base entries to the base record 302.

The timestamp 316 of each of the change entries may indicate the time that the corresponding change occurred in the base record 302. For example, the change record 312 indicates that the base entry corresponding to "Augusta Lovelace" may have been added to the base record 302 at a timestamp 316 of "Jan. 11, 2020 04:05:05," and may also indicate that the base entry corresponding to "Marie Curie" may have been added to the base record 302 at a timestamp 316 of "Jan. 11, 2020 04:05:09."

The entry number 318 of each change entry in the change record 312 may be primary keys of the change entries in the change record 312. As illustrated, each of the change entries within the change record 312 may have a different entry number 318. As illustrated in the example of FIG. 3A, the entry number 318 of each of the change entries may correspond to its order of occurrence. For instance, the change entry indicating the addition of the base entry corresponding to "Augusta Lovelace" may have an entry number 318 of "1," and the change entry indicating the addition of the base entry corresponding to "Marie Curie" may have an entry number 318 of "5."

According to some implementations, the change record 312 may be used as an audit record of the base record 302, or may be used to update an audit record of the base record 302. By tracking each change to the base record 302, the change entries in the change record 312 can be used to identify intermediate changes to the base record 302 that are not captured in the base record 302 itself. At the first time, each one of the changes in the change record 312 are apparent from the base record 302, but at subsequent times (illustrated in FIG. 3B, FIGS. 3C, and 3D), the change record 312 may capture changes that are not apparent from the base record 302.

In various implementations, one or more derived records may be used to store copies of one or more of the base entries of the base record 302 remotely from the base record 302. In order to update a derived record based on ongoing changes to the base record 302, first updated data 320 may be generated based on the change record 312. For example, an external system that maintains a derived record may submit an external query for information associated with changes to the base record 302.

The first updated data 320 can be generated, based on the change record 312, in response to an external query and/or on a scheduled basis. The first updated data 320 may include at least some of the data stored in the change record 312. For instance, as illustrated in FIG. 3A, the first updated data 320 may include the identifier 304, name 306, birthdate 308, occupation 310, change type 314, and entry number 318 fields stored in the change record 312.

Updated data, such as the first updated data 320, may be transmitted to an external system in response to an external query and/or on a scheduled basis, and the external system may use the updated data to accurately recreate the base record 302 in a derived record at the first time. In some cases, a derived record maintained by an external system may be updated over time periodically, and/or in response to multiple external queries submitted at different times. For instance, a derived record maintained by an external system may be updated at 00:00:01 each day based on a daily external query submitted by the external system. However, another derived record maintained by a different external system may be updated at 00:00:01 every other day, based on different external queries submitted by the different external system.

FIG. 3A represents an example of first updated data 320 provided to both a first external system and a second external system at the first time. The first external system may be configured to update a first derived record on a daily basis, and FIGS. 3B and 3C represent update data provided to the first external system to update first derived record at a second time and at a third time. However, the second external system may be configured to update a second derived record every two days. Accordingly, although the first updated data 320 shown in FIG. 3A may be provided to the second external system at the first time, subsequent updated data may not be provided to the second external system until the third time, as shown in FIG. 3D.

FIG. 3B shows example 300 at a second time. For instance, the second time may be Jan. 13, 2020 at 00:00:01. As shown in FIG. 3B, the base record 302 may have been changed since the first time shown in FIG. 3A. For instance, a base entry corresponding to "Melitta Bentz" has been added to the base record 302. In addition, a previous base entry corresponding to "Ludwig van Beethoven" may have been deleted from the base record 302.

These changes may be reflected in the change record 312 at the second time. As illustrated, the change record 312 continues to include the change entries that indicate the addition of the base entries corresponding to identifiers 304 1 through 7. In addition, the change record 312 includes two additional change entries with timestamps 316 indicating that the corresponding changes to the base entries occurred during January 12, between the first time and the second time. The first new change entry corresponds to entry number 318 "8." The first new change entry in the change record 312 indicates that the base entry corresponding to "Melitta Bentz" has been added to the base record 302. The second new change entry corresponds to entry number 318 "9." The second new change entry in the change record 312 indicates that the base entry corresponding to "Ludwig Van Beethoven" has been deleted from the base record 302.

Second updated data 322 may be generated in order to update the first derived record, maintained at the first external system, based on the changes to the base record 302 that occurred since the first derived record was last updated at the first time, one day earlier. According to some implementations, the changes that occurred between the first time and the second time can be indicated in the second updated data 322. For example, as illustrated in FIG. 3B, the second updated data 322 may include two entries corresponding to the addition of the "Melilla Bentz" base entry and the deletion of the "Ludwig van Beethoven" base entry. The first external system hosting the first derived record can use the second updated data 322 to accurately and completely update the first derived record based on the changes that occurred to the base record 302 between the first and second times.

FIG. 3C shows example 300 at a third time. For instance, the third time may be Jan. 14, 2020 at 00:00:01. As shown in FIG. 3C, the base record 302 may have been changed since the second time shown in FIG. 3B. For instance, the name 306 of a base entry corresponding to identifier 304 "1" may have been modified from "Augusta Lovelace" to "Ada Lovelace." In addition, the name 306 of the base entry corresponding to identifier 304 "4" may have been changed from "George Edison" to "Thomas Edison." Further, the occupation 310 of the base entry corresponding to identifier 304 "4" may have been modified from "Teacher" to "Entrepreneur."

These changes may be reflected in the change record 312 at the third time. As illustrated, the change record 312 continues to include the change entries that were included in the change record 312 at the first time and at the second time. In addition, the change record 312 includes three additional change entries with timestamps 316 indicating that the corresponding changes to the base entries occurred during January 13, between the second time and the third time. A change entry with entry number 318 "10" may indicate that the base entry corresponding to identifier 304 "1" has been updated, and the name 306 of the base entry has been defined as "Ada Lovelace." A change entry with entry number 318 "11" may indicate that the base entry corresponding to identifier 304 "4" has been updated, and the occupation 310 of the base entry has been defined as "Entrepreneur." A change entry with entry number 318 "12" may indicate that the base entry corresponding to identifier 304 "4" was subsequently updated once again, and the name 306 of the base entry has been defined as "Thomas Edison."

Third updated data 324 may be generated in order to update the first derived record, maintained at the first external system, based on the changes to the base record 302 that occurred since the first derived record was last updated at the second time, one day earlier. According to some implementations, the changes that occurred between the second time and the third time can be indicated in the third updated data 324. For example, the third updated data 324 may include one entry that indicates the update to the base entry that corresponds to identifier 304 "1." However, even though the base entry corresponding to identifier 304 "4" was updated multiple times since the second time, the third updated data 324 may be generated based on only the most recent change entry associated with the base entry corresponding to identifier 304 "4." For example, as illustrated in FIG. 3C, the third updated data 324 may include an entry corresponding to the change entry identified by entry number 318 "12," which indicates both that the name 306 has been updated to "Thomas Edison" and that the occupation 310 has been updated to "Entrepreneur." The third updated data 324 may omit entry number 318 "11" in the change record 312, which indicates the previous change to the base entry corresponding to identifier 304 "4."

FIG. 3D also shows example 300 at a third time. As discussed above with respect to FIG. 3C, at the third time (e.g., Jan. 14, 2020 at 00:00:01), the change record 312 may include change entries added before the first time, change entries added between the first time and the second time, and change entries added between the second time and the third time. The first external system may be configured to submit external queries to the change record 312 once a day, such that the first external system received the first updated data 320 at the first time, the second updated data 322 at the second time, and the third updated data 324 at the third time, as discussed above with respect to FIGS. 3A-3C. However, the second external system may be configured to submit external queries to the change record 312 every other day, such that the second external system received the first updated data 320 at the first time, but did not receive the second updated data 322 at the second time. Accordingly, rather than providing the third updated data 324 to the second external system at the third time that only includes data relevant to changes between the second time and the third time, different fourth updated data 326 can be provided to the second external system at the third time as shown in FIG. 3D.

The fourth updated data 326, provided to the second external system at the third time, can include change entries with timestamps between the first time, when the second external system was last updated, and the third time. For example, the fourth updated data 326 can include a first entry corresponding to the change entry identified by entry number 318 "8," indicating the addition of the "Melilla Bentz" base entry. The fourth updated data 326 can also include a second entry corresponding to the change entry identified by entry number 318 "9," indicating the deletion of the "Ludwig van Beethoven" base entry. The fourth updated data 326 can also include a third entry corresponding to the change entry identified by entry number 318 "10," indicating an update to define the name 306 as "Ada Lovelace." The fourth updated data 326 can also include a fourth entry corresponding to the change entry identified by entry number 318 "11," indicating both that the name 306 has been updated to "Thomas Edison" and that the occupation 310 has been updated to "Entrepreneur." Similar to the third updated data 324 provided to the first external system at the third time, the fourth updated data 326 provided to the second external system at the third time may omit entry number 318 "11" in the change record 312, which indicates the previous change to the base entry corresponding to identifier 304 "4."

Accordingly, although the first external system and the second external system may both submit external queries for change data at the third time, different updated data based on the change record 312 can be provided to the first external system and the second external system at the third time as shown in FIGS. 3C and 3D. Additionally, although the first updated data 320, the second updated data 322, the third updated data 324, and/or the fourth updated data 326 can be generated and sent over time to one or more external systems based on the change record 312, the entries in the change record 312 can be maintained such that the entries are available to generate additional updated data based on any subsequent external queries associated with the change record 312.

Figure 4:
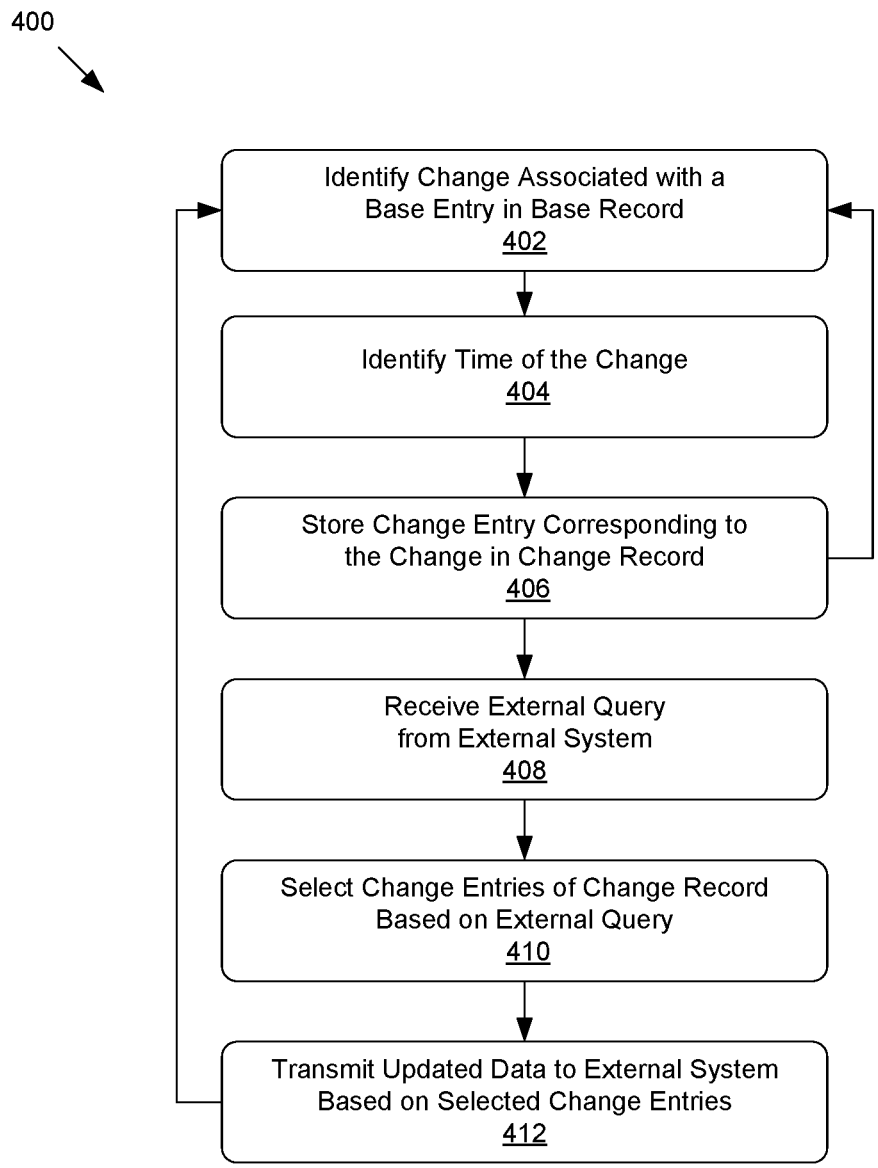
FIG. 4 shows an example process for updating a remote copy of a table in a base record using a change record.

FIG. 4 shows an example process 400 for updating a remote copy of a table in a base record using a change record. In various cases, the process 400 can be performed by an entity including at least one computing system, such as a computing system described below with respect to FIG. 5. Unless otherwise noted, the process 400 will be described as being performed by the change tracker 132, however, in some cases, the process 400 can be performed by the change tracker 132 or another element associated with the primary system 102, the change tracking system 106, or any other element of the system 100.

At block 402, the change tracker 132 may identify a change associated with a base entry (e.g., a base entry among the base entries 110) in a base record (e.g., the base record 108). In various examples, the base entry may have been added, updated, or deleted from the base record. At block 402, the change tracker 132 may identify the change action (e.g., the addition, update, or deletion) associated with the base entry in the base record. According to some cases, the base record may be a relational database that uses primary keys to identify base entries. The base entry may include one or more modifiable data fields storing one or more data types. For example, the base entry may include at least one number (e.g., a floating-point number), integer, string, character, Boolean, or some other data type. In some instances, the base entry may omit a complex data type, such as an image, a video, or an audio file. The change associated with the base entry may be executed in response to a query. According to some examples, the change may be reported to the change tracker 132 by a software engine (e.g., the base record engine 124 and/or a database engine) associated with the base record.

At block 404, the change tracker 132 may identify a time of the change. In some cases, the change tracker 132 may be associated with an internal clock of a computing device, which the change tracker 132 can use to identify the time of the change. In some cases, the time may be identified as a timestamp. According to some examples, the change tracker 132 can estimate time of the change based on the time at which the change tracker 132 identifies that the change took place. For example, if the base system 104 storing the base entry reports the change to the change tracker 132, the change tracker 132 may estimate the time of the change as the time at which the report of the change is received.

At block 406, the change tracker 132 may store a change entry corresponding to the change. The change entry (e.g., one of the change entries 114) may be stored in a change record (e.g., the change record 112). In some cases, the change record may be a relational database or other type of database. Data in the change record, such as the change entry added at block 406, may also be selectable and/or retrievable based on external queries as described herein. The change entry may include data stored in a memory associated with and/or operably connected to the base entry. For example, if the base entry was updated, the change entry may include the updated data in the base entry. In some cases, the change entry indicates the time of the change. For instance, the change entry may include the timestamp indicating the time at which the change occurred. In some examples, the change entry includes an indication of the type of change that took place. For example, the change entry may include an indication that the change was an addition, an update, or a deletion to the base entry.

In some cases, the change tracker 132 may generate a new change entry in the change record based on the change identified at block 404. For example, the change identified at block 404 may be an addition of the base entry to the base record. The new change entry added to the change record at block 406 may indicate the data in the base entry, an indication that the base entry has been added, and/or a time that the base entry has been added to the base record.

The change tracker 132 may repeat block 402 through block 406 as additional changes are identified in the base record. For example, over a period of time ten changes to the base record may be identified at block 402, times of those ten changes can be identified at block 402, and corresponding change entries can be added to the change record at block 406.

At block 408, the change tracker 132 may receive an external query (e.g., one of the external queries 120) from an external system (e.g., one of the external systems 116). The external query may request updated data stored in the change record, such as the most recent change records associated with each of the base entries that were added to the change record since the last external query submitted by the external system. In some examples, the change tracker 132 may be configured with a standing external query associated with a recurring reporting period, such that the change tracker 132 is configured to provide updated data to a particular external system on a recurring scheduled basis.

At block 410, the change tracker 132 may, based on the external query received at block 408, select change entries in the change record. In some examples, if the external query requests updated data associated with a defined reporting period, such as the previous day, the change tracker 132 may be configured to avoid selecting multiple change entries in the change record that are associated with a common base entry, and instead select the most recently-added change entry associated with that base entry. For instance, if the base entry was changed multiple times during the reporting period, the change tracker 132 may select the most recently added (e.g., as defined by timestamps within the change entries) change entry associated with that base entry, and avoid selecting earlier change entries associated with earlier and now outdated changes to the base entry that were made during the reporting period.

At block 412, the change tracker 132 may transmit updated data to the external system, based on the change entries selected at block 410, in response to the external query received at block 408. In some cases, the updated data can indicate various changes to one or more base entries in the base record that occurred during a reporting period. The report may omit indications of any changes that occurred before the reporting period. Accordingly, the updated data provided by the change tracker 132 can cause the external system to accurately update a derived record based on ongoing changes to the base record.

The change tracker 132 may transmit the updated data to the external system at block 412 via at least one communication network (e.g., communication network(s) 130). In some examples, the at least one communication network may have finite communication resources (e.g., bandwidth). However, by selecting change entries at block 410 with timestamps during a reporting period indicated by the external query, and by selecting the most recent change entry associated with each base entry, the updated data transmitted at block 412 can omit data associated with base entries that were unchanged during the reporting period, and may also omit data associated with intervening but now outdated changes to base entries during the reporting period. Accordingly, selecting a specific set of change entries at block 410 based on the external query and transmitting corresponding updated data at block 412, instead of sending information about all changes to the base record, may conserve the communication resources of the communication network(s).

After sending the updated data at block 412, the change tracker 132 may return to block 402 to continue identifying changes in the base record, adding corresponding change entries to the change record, and responding to additional external queries from the same external system and/or other external systems. For example, different external systems may send different external queries that request updates associated with different sets of base entries, and/or that request updates at different times. For instance, the change tracker 132 may provide (e.g., transmit) updated data to a first external system at block 412 in response to external queries on a first recurring basis (e.g., once an hour, once every three hours, once a day, once a week, or on any other scheduled basis). However, the change tracker 132 may also provide updated data to one or more other external systems at block 412 in response to external queries received at different times.

Figure 5:
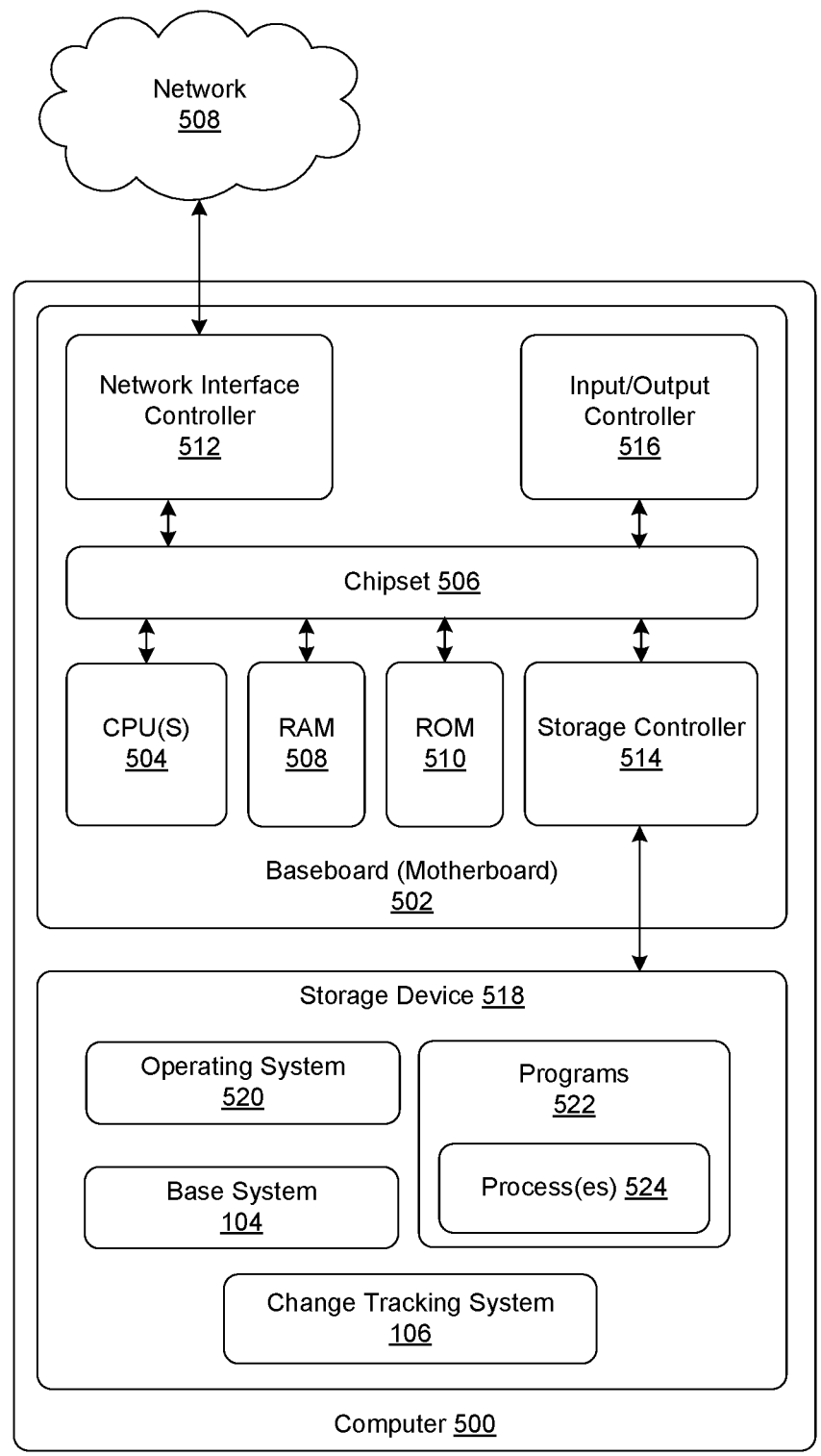
FIG. 5 shows an example computer architecture for a computer capable of executing program components for implementing the functionality described herein.

FIG. 5 shows an example computer architecture for a computer 500 capable of executing program components for implementing the functionality described herein. The computer architecture shown in FIG. 5 illustrates a conventional server computer, workstation, desktop computer, laptop, tablet, network appliance, e-reader, smartphone, or other computing device, and can be utilized to execute any of the software components presented herein. The server computer 500 may, in some examples, correspond to a primary system, such as the primary system 102 described herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 508. The chipset 506 can include functionality for providing network connectivity through a Network Interface Controller (NIC) 512, such as a gigabit Ethernet adapter. The NIC 512 is capable of connecting the computer 500 to other computing devices over the network 508. It should be appreciated that multiple NICs 512 can be present in the computer 500, connecting the computer to other types of networks and remote computer systems. In some instances, the NICs 512 may include at least on ingress port and/or at least one egress port.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by a computing system (e.g., the primary system 102, the base system 104, the change tracking system 106, the user device 126, the external systems 116, the audit system 136, or the like), may be supported by one or more devices similar to computer 500. Stated otherwise, some or all of the operations described herein may be performed by one or more computer devices 500 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

As illustrated in FIG. 5, the storage device 518 stores the base system 104 and/or the change tracking system 106, which are described above with reference to FIG. 1. In some implementations, at least one of the base system 104 or the change tracking system 106 can be omitted. Using instructions stored in the base system 104 and/or the change tracking system 106, the CPU(s) 504 may be configured to track changes to a base record in a change record, provide updated data to one or more external systems that reflects the changes to the base record, and/or provide audit reports identifying the changes to the base record to an audit system.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. One or more computing devices, comprising:
   at least one processor; and
   memory storing a change database and computer-executable instructions associated with a change tracking system that maintains the change database, wherein the computer-executable instructions, when executed by the at least one processor, cause the at least one processor to perform operations associated with the change tracking system, the operations comprising:
   detecting changes to base entries of a base database, wherein the base database is separate from the change database;
   identifying times of the changes to the base entries;
   generating change entries in the change database that correspond to the changes to the base entries, wherein the change entries include data associated with the base entries that reflect the changes, timestamps associated with the times of the changes, and indications of change types of the changes;
   receiving, via a network, an external query from an external system, wherein:
     the external system maintains a derived database that stores copies of at least a subset of the base entries in the base database, and
     the external query indicates at least one of the subset of the base entries or a timeframe;
   selecting a set of one or more selected change entries, from the change entries in the change database, that corresponds to the at least one of the subset of the base entries or the timeframe indicated in the external query; and
   transmitting, via the network, updated data comprising the set of one or more selected change entries to the external system in response to the external query, wherein the updated data causes the external system to update the derived database based on the set of one or more selected change entries.

2. The one or more computing devices of claim 1, wherein:
   the change database comprises a first change entry associated with a first change, made at a first time, to a particular base entry of the base entries,
   the change database comprises one or more subsequent change entries associated with one or more subsequent changes, made at one or more times later than the first time, to the particular base entry, selecting the set of one or more selected change entries comprises selecting a latest one of the one or more subsequent change entries and not selecting the first change entry, and the updated data omits the first change entry.

3. The one or more computing devices of claim 1, wherein the indications of change types of the changes include one or more of deletion indications, addition indications, or update indications.

4. The one or more computing devices of claim 1, wherein the external query is a first external query, the external system is a first external system, the derived database is a first derived database maintained by the first external system, and the operations further comprise:

receiving, via the network, a second external query from a second external system that maintains a second derived database, wherein:

the second derived database stores copies of at least a second subset of the base entries in the base database, and the second external query is different than the first external query;

selecting a second set of one or more selected change entries, from the change entries in the change database, based on the second external query; and transmitting, via the network, second updated data comprising the second set of one or more selected change entries to the second external system in response to the second external query, wherein the second updated data causes the second external system to update the second derived database based on the second set of one or more selected change entries.

5. The one or more computing devices of claim 4, further comprising:

receiving, via the network, external queries from the first external system and the second external system at different intervals, and transmitting, via the network, different updated data to the first external system and the second external system in response to the external queries, wherein the different updated data comprises different selected change entries selected based at least in part on the different intervals.

6. The one or more computing devices of claim 1, wherein the operations further comprise:

receiving, via the network, an audit query from an audit system; and transmitting, via the network, an audit report to the audit system, the audit report comprising a plurality of change entries in the change database.

7. The one or more computing devices of claim 6, wherein:

the change database comprises multiple change entries associated with changes to a particular base record during a particular period of time, the updated data:

includes a most recent change entry, of the multiple change entries, associated with the particular base record, and omits one or more earlier change entries, of the multiple change entries, associated with the particular base record, and the audit report includes the multiple change entries associated with the particular base record.

8. A computer-implemented method, comprising:

detecting, by one or more processors associated with a change tracking system, a first change, occurring at a first time, to a base entry of a base record maintained by a base system, wherein the change tracking system maintains a change record that is separate from the base record;

generating, by the one or more processors, and in the change record, a first change entry that corresponds to the first change to the base entry, wherein the first change entry reflects the first change, includes a first timestamp indicating the first time of the first change, and includes a first indication of a first change type of the first change;

detecting, by the one or more processors, a second change, occurring at a second time later than the first time, to the base entry of the base record;

generating, by the one or more processors, and in the change record, a second change entry that corresponds to the second change to the base entry, wherein the second change reflects the second change, includes a second timestamp indicating the second time of the second change, and includes a second indication of a second type of the second change;

receiving, by the one or more processors, and via a network, an external query from an external system, wherein:

the external system maintains a derived database that stores copies of at least a subset of base entries in the base record, and the external query indicates at least one of the subset of the base entries or a timeframe;

selecting, by the one or more processors, a set of one or more selected change entries, from change entries in the change record, that corresponds to the at least one of the subset of the base entries or the timeframe indicated by the external query, wherein the set of one or more selected change entries:

omits first data selected from the first change entry, and includes second data selected from the second change entry; and transmitting, by the one or more processors, and via the network, updated data comprising the set of one or more selected change entries to the external system in response to the external query, wherein the updated data causes the external system to update the derived database based on the set of one or more selected change entries.

9. The computer-implemented method of claim 8, wherein detecting the first change comprises identifying that the base entry has been added to the base record, identifying that an element of the base entry has been updated, or identifying that the base entry has been deleted from the base record.

10. The computer-implemented method of claim 8, wherein detecting the first change comprises receiving an indication of a database query received by the base system that maintains the base record.

11. The computer-implemented method of claim 8, wherein the first change type indicates that the base entry has been added to the base record, the base entry has been deleted from the base record, or the base entry has been updated in the base record.

12. The computer-implemented method of claim 8, wherein a first size of the updated data is smaller than a second size of the base record.

13. The computer-implemented method of claim 8, wherein the timeframe indicated by the external query corresponds to a reporting period, and the updated data additionally includes information associated with one or more additional change records associated with changes to one or more additional base entries of the base record that occurred during the reporting period.

14. The computer-implemented method of claim 8, further comprising:
receiving, by the one or more processors, and via the network, an audit query from an audit system; and
transmitting, by the one or more processors, and via the network, an audit report to the audit system in response to the audit query, wherein the audit report:
includes the first data selected from the first change entry, and
includes the second data selected from the second change entry.

15. One or more non-transitory computer-readable media storing computer-executable instructions that, when executed by one or more processors, cause the one or more processors to perform operations associated with a change tracking system, the operations comprising:
detecting changes to base entries of a base record maintained by a base system, wherein the base record is separate from a change record maintained by the change tracking system;
identifying times of the changes to the base entries;
generating change entries in the change record that correspond to the changes to the base entries, wherein the change entries include data associated with the base entries that reflect the changes, timestamps associated with the times of the changes, and indications of change types of the changes;
receiving, via a network, a first external query from a first external system, wherein:
the first external system maintains a first derived record that stores first copies of at least a first subset of the base entries in the base record, and
the first external query requests a first set of change entries associated with the changes to the base record that occurred between a first time and a second time;
transmitting, via the network, first updated data to the first external system, the first updated data including a first set of change entries, selected from the change record, with first timestamps between the first time and the second time;
receiving, via the network, a second external query from a second external system, wherein:
the second external system maintains a second derived record that stores second copies of at least a second subset of the base entries in the base record, and
the second external query requests a second set of change entries associated with the changes to the base record that occurred between a third time and a fourth time; and
transmitting, via the network, second updated data to the second external system, the second updated data including a second set of change entries, selected from the change record, with second timestamps between the third time and the fourth time.

16. The one or more non-transitory computer-readable media of claim 15, wherein:
the change record comprises a first change entry associated with a first change to a particular base entry of the base entries,
the change record comprises a second change entry associated with a second change to the particular base entry,
the first change and the second change were both made between the first time and the second time,
the first updated data includes data associated with a more recent one of the first change entry and the second change entry, and
the first updated data omits data associated with an older one of the first change entry and the second change entry.

17. The one or more non-transitory computer-readable media of claim 15, wherein the indications of change types include one or more of deletion indications, addition indications, or update indications.

18. The one or more non-transitory computer-readable media of claim 15, wherein detecting the changes comprises identifying that one or more base entries have been added to the base record, identifying that elements of one or more existing base entries have been updated in the base record, or identifying that at least one base entry has been deleted from the base record.

19. The one or more non-transitory computer-readable media of claim 15, wherein detecting the changes comprises receiving an indication of database queries received by the base system that maintains the base record.

20. The one or more non-transitory computer-readable media of claim 15, wherein the operations further comprise:
receiving, via the network, an audit query from an audit system; and
transmitting, via the network, an audit report to the audit system, the audit report comprising a plurality of change entries in the change record.

* * * * *